No. 796,060. PATENTED AUG. 1, 1905.
T. DUNCAN.
ELECTRIC METER.
APPLICATION FILED JAN. 8, 1902.
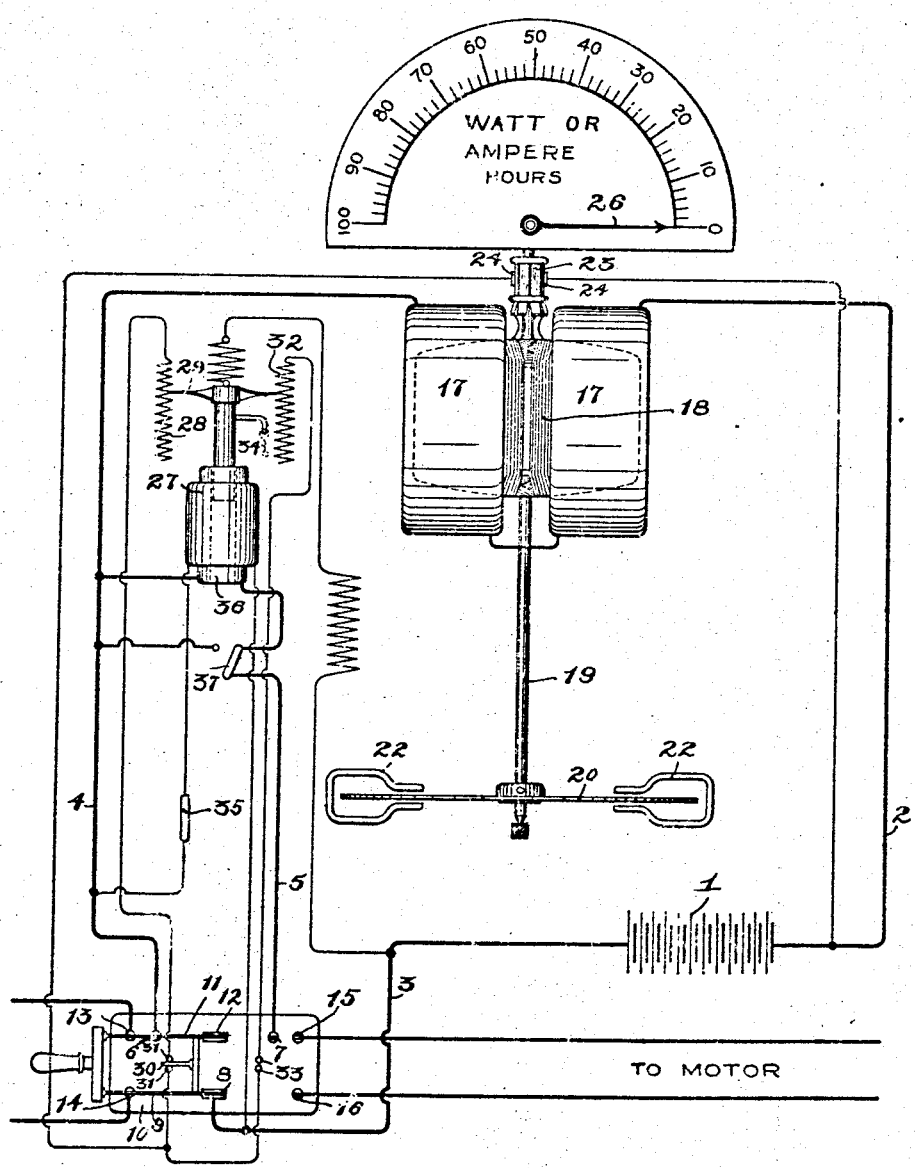
WITNESSES:
INVENTOR.
Thomas Duncan
BY Charles A. Brown Clagg & Brefeld
ATTORNEYS.

UNITED STATES PATENT OFFICE.

THOMAS DUNCAN, OF LAFAYETTE, INDIANA.

ELECTRIC METER.

No. 796,060.  Specification of Letters Patent.  Patented Aug. 1, 1905.

Application filed January 8, 1902. Serial No. 88,834.

*To all whom it may concern:*

Be it known that I, THOMAS DUNCAN, a citizen of the United States, residing at Lafayette, in the county of Tippecanoe and State of Indiana, have invented a certain new and useful Improvement in Electric Meters, of which the following is a full, clear, concise, and exact description, reference being had to the accompanying drawing, forming a part of this specification.

My invention relates to electric meters, and is especially useful in connection with meters employed in association with storage batteries, though I do not wish to be limited in the application of each feature of my invention to meters of this class.

The invention has for its object, first, the provision of a meter, in combination with adjusting means, whereby the meter may measure in units of watt-hours or ampere-hours, and, second, the provision of the improved means whereby the meter may compensate for the varying inefficiency of the storage battery that is discharged at differing rates.

I preferably accomplish the first object of my invention by providing a pressure field-winding, in combination with an automatically-operated rheostat whose operating means is subject to impressed pressure, this rheostat being brought into service when the meter is to measure in units of ampere-hours to maintain the field due to the pressure-winding constant, the meter thus responding to the current-flow to measure the energy in units of ampere-hours. When the meter is to measure in units of watt-hours, the automatically-operated rheostat is thrown out of circuit, whereby the field due to the pressure-winding may vary according to the pressure, thereby to cause the operation of the meter to measure in units of watt-hours.

In accomplishing the second object of my invention I employ an electromagnetic device in series with the storage battery, which electromagnetic device is adapted to modify the action of the rheostat when the meter is measuring in units of watt-hours to produce a rate of operation of the meter varying with the battery discharge to compensate for corresponding varying battery losses. When the meter is measuring in units of ampere-hours, the electromagnetic device included in series with the battery is adapted directly to operate the rheostat to effect the required changes in the rate of variation upon operation in the battery discharge.

I will explain my invention more fully by reference to the accompanying drawing, which illustrates a storage-battery system with a meter of my invention associated therewith.

In the drawing a storage battery 1 is illustrated, having mains 2 and 3. The main 2 is provided with bifurcated branches 4 and 5, terminating in contacts 6 and 7, while the main 3 terminates in a pivotal mounting 8, upon which a switch-blade 9 of a switch 10 is secured. A second switch-blade 11 of the switch 10 is also placed upon a pivotal mounting 12. Terminals 13 and 14 of a charging-circuit are illustrated. Terminals 15 and 16 of conductors leading to translating means, as a motor, are also illustrated. When the switch 10 is thrown to the left, the charging-machine or source of current is thrown into circuit with the storage battery. When the switch is thrown to the right, the storage battery is thrown into circuit with the translating means.

I have illustrated a meter having a current-winding included in the main 2, this current-winding being subdivided into coils 17 17. The meter is also provided with a pressure-winding 18, included in bridge between the leads or mains. These windings of the meter are constantly in circuit with the battery irrespective of its association with the charging-machine or translating means. The meter-winding 18 is preferably in the form of an armature and is mounted upon a spindle 19, the lower end of which is provided with a damping-disk 20 within the fields of damping-magnets 22 22, that are preferably permanent. The shaft 19 also carries the commutator 23, against which bear the brushes 24 24, that serve to include the armature of the meter in circuit.

The meter is provided with gearing at its upper end to actuate the measuring-index 26, which by coöperation with a suitable reading-scale serves to indicate the amount of energy stored in the battery in charging and remaining in the battery in discharging in units of ampere-hours or watt-hours, according to the adjustment of the instrument, as hereinafter specified.

To cause the meter to measure in units of ampere-hours, I desire to maintain the field due to the armature constant, for which purpose I provide regulating means including an operating electromagnetic device 27, that is subject to the impressed pressure that serves to maintain the uniform flow of current through the armature. For this purpose a rheostat resistance 28 is preferably employed, whose arm 29 is mounted upon the core of a solenoid, which is the preferred form of the controlling electromagnetic device. As the current of the pressure-helix of the solenoid varies upon variation in pressure the amount of this resistance included in circuit with the armature is correspondingly varied. Thus when the pressure increases the strength of the solenoid increases, thereby to actuate the rheostat-arm to include more resistance in circuit with the armature, thereby preventing an increased flow of current through the armature upon an increase in the pressure. When the impressed pressure decreases, the core of the solenoid may be released sufficiently to permit such a return thereof as will cause an exclusion of sufficient resistance from the armature-circuit to maintain the given flow of current through the armature.

When it is desired to have the meter measure in units of watt-hours, then the means for maintaining the field due to the pressure-winding constant is removed, so that upon each variation in pressure a corresponding change in the pressure-field may occur to produce a torque in proportion to the watts. The rheostat resistance 28 that I have described is only included in circuit when the switch 10 is thrown to the left, the circuit through the resistance being closed by the supplemental switch-blade 30, that then engages the contacts 31, included in the conductor containing the resistance 28.

When the meter is adapted to the double function of measuring the ampere-hours supplied to and emanating from a storage battery, a rheostat resistance 32 is employed, which is thrown into circuit with the armature when the switch 10 is thrown to the right, the supplemental blade 30 then engaging the contacts 33, included in the conductor containing the resistance 32. The operation of the adjusting mechanism is the same as heretofore described, the winding of the electromagnet 27 being subject in the one case to the charging-machine pressure and in the other case to the battery-pressure. If it should be desired to permit the meter to measure in units of watt-hours, then the armature of the meter should be relieved of the modifying influence of the rheostat resistance. For this purpose the core of the solenoid may be latched by a hook 34 or the circuit including the pressure-winding might be opened at the switch 35.

I will now describe that feature of my invention relating to the compensation for varying battery discharges.

In the use of storage batteries it is well known that the output of the battery will always be less than the energy stored therein and that the battery loss will increase upon a sufficient increase in the rate of battery discharge. For example, if the battery is charged one thousand ampere-hours at its normal rate of charge—say one hundred amperes per hour for ten hours—the total discharge at the same rate which can be made available without harm to the battery will not be more than about eighty per cent. of the energy charged into the battery with some makes of battery, this battery loss varying with different makes—that is, the battery will effectively operate at one hundred amperes per hour for eight hours, giving out eight hundred ampere-hours after receiving one thousand. If the rate of discharge is increased, the total output will be diminished. For example, with certain makes of battery the energy discharged will not be over about seventy per cent. if the rate is increased to one hundred and forty amperes per hour, sixty per cent. if the rate of discharge is doubled, and forty per cent. if the rate of discharge is quadrupled.

I have provided a means adapted to compensate for varying battery losses due to the varying rates of discharge, so that the user of the battery may know when the available energy in the battery is spent. This means may coöperate with the meter, whether it is designed or adjusted to measure in units of ampere-hours or units of watt-hours. Ordinarily a meter associated with a storage battery that is discharged at varying rates will indicate the presence of more energy in the battery than actually exists. In my present invention I accomplish this result by varying the torque of the meter, which I do by providing the magnet 27 with an added coil 36, that is preferably only included in series with the battery when the battery is discharging. This series winding 36 operates when the switch 35 is open to govern the amount of resistance 32 in circuit with the armature to produce a torque corresponding to the rate of battery discharge, the winding 36 acting alone to govern the rheostat-arm 29 when the meter is measuring in units of watt-hours. When the meter is measuring in units of ampere-hours, the switch 35 being then closed, the winding 36 serves to create a field opposing that due to the winding 27, so that upon an increase in battery discharge the resultant field of the controlling-solenoid will be decreased, permitting the rheostat-arm 29 to rise, thereby cutting out sufficient resistance 32 from circuit with the armature to properly increase the rate of operation of the meter per unit of load or energy to compensate for the increased rate of battery discharge. If the battery discharge should decrease, the strength of the opposing field, due to the winding 36, is decreased, thereby permitting the pressure-field of the solenoid to attract the rheostat-arm.

If it should be desired to register the ampere-hours or the watt-hours taken from the battery without considering the battery losses, the switch 37 may be moved to the left to cut out the modifying or regulating winding 36. When the switch 10 is thrown to the left, the winding 36 is in any event preferably excluded from circuit.

By the apparatus herein shown I provide means whereby when the meter is to measure in units of ampere-hours its operation will be only due to the main current-flow, while when it is to operate in units of watt-hours the meter is subject to the action of both pressure and current.

I have shown an integrating meter; but I do not wish to be limited in all embodiments of the invention to such a meter.

I do not wish to be limited to the precise instrumentalities herein disclosed, as modifications may readily be made without departing from the spirit of the invention.

Having, however, thus described my invention, I claim as new and desire to secure by Letters Patent—

1. The combination with a meter, of adjusting means for causing the same to measure either in units of ampere or watt hours, substantially as described.

2. The combination with a meter, of adjusting means for causing the meter to measure proportionally to watts or amperes, substantially as described.

3. The combination with a meter, of adjusting means for modifying the torque of the meter to cause the same to measure proportionally to the watts or proportionally to the amperes, substantially as described.

4. The combination with a meter provided with current and pressure windings, of adjusting means for governing the field due to the pressure-winding to cause the meter to operate proportionally to the amperes, said adjusting means being separable from the meter to permit the same to measure proportionally to the watts, substantially as described.

5. The combination with a meter provided with current and pressure windings, of means for regulating the field due to the pressure-winding, a controlling electromagnetic device for governing the operation of the said means, said electromagnetic device being subject to the pressure impressed upon the circuit associated with the meter, whereby the operation of the adjusting means is varied according to the impressed pressure to permit the meter to operate proportionally to the amperes, and means whereby the said regulating means are operatively dissociated from the meter to permit the meter to operate proportionally to the watts, substantially as described.

6. The combination with a meter provided with current and pressure windings, of a rheostat resistance in circuit with the pressure-winding for regulating the field due thereto, a controlling electromagnetic device for governing the operation of the arm of the rheostat, said electromagnetic device being subject to the pressure impressed upon the circuit associated with the meter, whereby the amount of the rheostat resistance included in circuit with the armature is automatically varied upon a variation in the impressed pressure to permit the meter to operate proportionally to the amperes, and means whereby the armature may be relieved of the regulating influence of the said electromagnetic device to permit the meter to operate proportionally to the watts, substantially as described.

7. The combination with a storage battery, of switching mechanism for connecting the same with a charging source of current or a translating means, a meter receiving current passing through the battery, said meter being provided with current and pressure windings, a rheostat having its resistance adapted for inclusion in circuit with the pressure-winding of the meter, an electromagnetic device for controlling the operation of the rheostat-arm to vary the amount of resistance in circuit with the armature, the said electromagnetic device being subject to battery-pressure, and a magnetizing-coil 36 in series with the battery, serving to modify the influence of the rheostat-controlling magnet to compensate for varying battery losses due to varying battery discharges, substantially as described.

8. The combination with a storage battery, of switching mechanism for connecting the same with a charging source of current or a translating means a meter receiving current passing through the battery, said meter being provided with current and pressure windings, a rheostat having its resistance adapted for inclusion in circuit with the pressure-winding of the meter, an electromagnetic device for controlling the operation of the rheostat-arm to vary the amount of resistance in circuit with the armature, the said electromagnetic device being subject to battery-pressure, a magnetizing-coil 36 in series with the battery, serving to modify the influence of the rheostat-controlling magnet to compensate for varying battery losses due to varying battery discharges, and means whereby the rheostat-arm will be subject to the magnetizing influence of the winding 36 alone, substantially as described.

9. The combination with a storage battery, of switching mechanism for connecting the same with a charging source of current or a translating means, a meter receiving current passing through the battery, said meter being provided with current and pressure windings, a rheostat having its resistance adapted for inclusion in circuit with the pressure-winding of the meter, an electromagnetic device for controlling the operation of the rheostat-arm to vary the amount of resistance in circuit with the armature, the said electromagnetic device being subject to battery-pressure, a magnetizing-coil 36 in series with the battery serving to modify the influence of the rheostat-controlling magnet to compensate for varying battery losses due to varying battery discharges, and means whereby the rheostat-arm will be subject to the operation of the pressure-winding of the electromagnet alone, substantially as described.

10. The combination with a storage battery, of switching mechanism for connecting the same with a charging source of current or a translating means, a meter receiving current passing through the battery, said meter being provided with current and pressure windings, a rheostat having its resistance adapted for inclusion in circuit with the pressure-winding of the meter, an electromagnetic device for controlling the operation of the rheostat-arm to vary the amount of resistance in circuit with the armature, the said electromagnetic device being subject to battery-pressure, a magnetizing-coil 36 in series with the battery serving to modify the influence of the rheostat-controlling magnet to compensate for varying battery losses due to varying battery discharges, and means whereby the rheostat-arm may be relieved of the influence of both the current and pressure windings, substantially as described.

11. The combination with a storage-battery, of switching mechanism for connecting the same in circuit with a charging source of current or a translating means, a meter receiving current from the storage battery and provided with current and pressure windings, means for governing the amount of current flowing through the pressure-winding, an electromagnetic device provided with a pressure-winding subject to the pressure of the battery for governing the operation of the said means, and a current-winding 36 in series with the battery and serving to modify the operation of the main pressure-winding of the magnet to compensate for varying battery losses due to varying battery discharges, substantially as described.

12. The combination with a storage battery, of switching mechanism for connecting the same in circuit with a charging source of current or a translating means, a meter receiving current from the storage battery and provided with current and pressure windings, means for governing the amount of current flowing through the pressure-winding, an electromagnetic device provided with a pressure-winding subject to the pressure of the battery for governing the operation of the said means, a current-winding 36 in series with the battery and serving to modify the operation of the main pressure-winding of the magnet to compensate for varying battery losses due to varying battery discharges, and means whereby the said pressure magnet-winding may be rendered inoperative, substantially as described.

13. The combination with a storage battery, of switching mechanism for connecting the same in circuit with a charging source of current or a translating means, a meter receiving current from the storage battery and provided with current and pressure windings, means for governing the amount of current flowing through the pressure-winding, an electromagnetic device provided with a pressure-winding subject to the pressure of the battery for governing the operation of the said means, a current-winding 36 in series with the battery and serving to modify the operation of the main pressure-winding of the magnet to compensate for varying battery losses due to varying battery discharges, and means whereby the said current-winding may be rendered inoperative, substantially as described.

14. The combination with a storage battery, of switching mechanism for connecting the same in circuit with a charging source of current or a translating means, a meter receiving current from the storage battery and provided with current and pressure windings, means for governing the amount of current flowing through the pressure-winding, an electromagnetic device provided with a pressure-winding subject to the pressure of the battery for governing the operation of the said means, a current-winding 36 in series with the battery and serving to modify the operation of the main pressure-winding of the magnet to compensate for varying battery losses due to varying battery discharges, and means whereby both the current and pressure magnet-windings may be rendered inoperative, substantially as described.

In witness whereof I hereunto subscribe my name this 16th day of August, A. D. 1901.

THOMAS DUNCAN.

Witnesses:
GEORGE L. CRAGG,
HERBERT F. OBERGFELL.